US008487760B2

(12) United States Patent
Kangas et al.

(10) Patent No.: US 8,487,760 B2
(45) Date of Patent: Jul. 16, 2013

(54) PROVIDING A USER ALERT (75) Inventors: Jari Kangas, Tempere (FI); Leo Kärkkäinen, Helsinki (FI); Mikko Nurmi, Tampere (FI); Ville Ojanen, Espoo (FI); Ilkka Salminen, Tampere (FI); Sunil Sivadas, Tampere (FI); Akos Vetek, Helsinki (FI)

(73) Assignee: Nokia Corporation, Espoo (FI)

( * ) Notice: Subject to any disclaimer, the term of this patent is extended or adjusted under 35 U.S.C. 154(b) by 351 days.

(21) Appl. No.: 12/833,519

(22) Filed: Jul. 9, 2010

(65) Prior Publication Data
US 2012/0007737 A1    Jan. 12, 2012

(51) Int. Cl.
*G08B 21/00*    (2006.01)
(52) U.S. Cl.
USPC ............... 340/540; 340/573.1; 340/691.3; 455/418; 455/567
(58) Field of Classification Search
USPC ............. 340/573.1, 691.3, 540; 455/418, 455/567
See application file for complete search history.

(56) References Cited

U.S. PATENT DOCUMENTS

| | | | |
|---|---|---|---|
| 4,228,806 A | 10/1980 | Lidow | |
| 5,577,510 A | 11/1996 | Chittum et al. | |
| 5,924,046 A * | 7/1999 | Martensson | 455/567 |
| 6,218,947 B1 | 4/2001 | Sutherland | |
| 6,330,457 B1 * | 12/2001 | Yoon | 455/550.1 |
| 7,016,705 B2 | 3/2006 | Bahl et al. | |
| 7,542,379 B2 | 6/2009 | Kimel et al. | |
| 2001/0014616 A1 * | 8/2001 | Matsuda et al. | 455/567 |
| 2002/0077534 A1 | 6/2002 | DuRousseau | |
| 2003/0080872 A1 | 5/2003 | Gutta et al. | |
| 2004/0209606 A1 | 10/2004 | Cleary et al. | |
| 2005/0064916 A1 | 3/2005 | Ozluturk et al. | |
| 2005/0190065 A1 | 9/2005 | Ronnholm | |
| 2006/0114222 A1 | 6/2006 | Araki et al. | |
| 2007/0173733 A1 | 7/2007 | Le et al. | |
| 2008/0157956 A1 | 7/2008 | Radivojevic et al. | |
| 2009/0111446 A1 * | 4/2009 | Cui et al. | 455/418 |
| 2009/0147973 A1 * | 6/2009 | Gitzinger et al. | 381/190 |
| 2009/0157325 A1 | 6/2009 | Jung et al. | |
| 2009/0259138 A1 | 10/2009 | Lin et al. | |
| 2010/0056226 A1 * | 3/2010 | Bansal et al. | 455/567 |
| 2010/0090835 A1 * | 4/2010 | Liu et al. | 340/573.1 |
| 2012/0007740 A1 * | 1/2012 | Kangas et al. | 340/573.1 |

FOREIGN PATENT DOCUMENTS

| | | |
|---|---|---|
| EP | 0 694 283 A2 | 1/1996 |
| EP | 1 522 256 A1 | 4/2005 |
| EP | 1 587 286 A2 | 10/2005 |
| EP | 1 867 274 A1 | 12/2007 |

(Continued)

OTHER PUBLICATIONS

International Search Report and Written Opinion for International Application No. PCT/IB2011/052952, mailed Nov. 29, 2011.

(Continued)

*Primary Examiner* — Mohammad Ghayour
*Assistant Examiner* — Mark Rushing
(74) *Attorney, Agent, or Firm* — Alston & Bird LLP (57) ABSTRACT

A method, apparatus and computer program are provided. The method comprises: determining that an event has occurred; obtaining, from at least one detector, a detection of one or more bio-signals from a user; and processing the detection of the one or more bio-signals to decide whether to control at least one user output device to initiate a user alert, contemporaneously with the occurrence of the event, indicating that the event has occurred.

14 Claims, 5 Drawing Sheets

FOREIGN PATENT DOCUMENTS

| | | |
|---|---|---|
| EP | 2 224 395 A1 | 9/2010 |
| JP | 2-034189 | 2/1990 |
| JP | 2000-268275 | 9/2000 |
| JP | 2003-018250 | 1/2003 |
| JP | 2004-049855 | 2/2004 |
| JP | 2004-305330 | 11/2004 |
| JP | 2005-151507 | 6/2005 |
| WO | WO 02/13672 A2 | 2/2002 |
| WO | WO 2004/012033 A2 | 2/2004 |
| WO | WO 2005/084538 A1 | 9/2005 |
| WO | WO 2006/090371 A2 | 8/2006 |
| WO | WO 2008/117145 A1 | 10/2008 |
| WO | WO 2009/033374 A1 | 3/2009 |
| WO | WO 2009/134205 | 11/2009 |
| WO | WO 2011/027266 A1 | 3/2011 |

OTHER PUBLICATIONS

International Search Report and Written Opinion for International Application No. PCT/IB2011/052951, mailed Nov. 29, 2011.

Über Review; "Top Ten Most Annoying Alarm Clocks"; [Online]; [Retrieved on Jun. 24, 2011]; Retrieved from the Internet <URL: http://www.uberreview.com/2006/03/top-ten-most-annoying-alarm-clocks.htm.

iMusic vol. 3 (3 CD Set—Classical); [Online]; [Retrieved on Jun. 24, 2011]; Retrieved from the Internet <URL: http://www.luxevivant.com/index.asp?PageAction=VIEWPROD&ProdID=236.

Nokia Developer; Arto Holopainen's Blog; "Beyond iPhone: Symbian Device Human body control"; [Online]; [Retrieved on Jun. 24, 2011]; Retrieved from the Internet <URL: http://www.developer.nokia.com/Community/Blogs/blog/arto-holopainens-forum-nokia-blog/2007/08/19/beyond-iphone-symbian-device-human-body-control.

Ironic Sans: Idea: Motion-detecting cell phone ringer; [Online]; [Retrieved on Jun. 24, 2011]; Retrieved from the Internet <URL: http://www.ironicsans.com/2009/05/idea_motiondetecting_cell_phon.html.

Microsoft Research using EEG to "read minds in order to tag images" [Online]; [Retrieved on Jun. 24, 2011]; Retrieved from the Internet <URL: http://www.ditii.com/2010/01/20/microsoft-research-using-eeg-to-read-minds-in-order-to-tag-images/.

Office Action for U.S. Appl. No. 12/833,509 dated Sep. 11, 2012.

\* cited by examiner

PROVIDING A USER ALERT

TECHNOLOGICAL FIELD

Embodiments of the present invention relate to controlling a user alert. In particular, they relate to using bio-signals to determine when to provide a user alert.

BACKGROUND

When an event occurs at a portable electronic device such as a mobile telephone, the portable electronic device may alert the user to the event. For example, a mobile telephone may provide an audible alert to inform the user that there is an incoming telephone call.

In some circumstances, the user may be concentrating and may not wish to be disturbed. If the mobile telephone provides an audible alert, the user's concentration may be broken.

BRIEF SUMMARY

According to some, but not necessarily all embodiments of the invention there is provided a method, comprising: determining that an event has occurred; obtaining, from at least one detector, a detection of one or more bio-signals from a user; and processing the detection of the one or more bio-signals to decide whether to control at least one user output device to initiate a user alert, contemporaneously with the occurrence of the event, indicating to the user that the event has occurred.

According to some, but not necessarily all embodiments of the invention there is provided an apparatus, comprising: at least one memory storing a computer program comprising computer program instructions; and at least one processor configured to execute the computer program instructions to cause the apparatus at least to perform: determining that an event has occurred; obtaining, from at least one detector, a detection of one or more bio-signals from a user; and processing the detection of the one or more bio-signals to decide whether to control at least one user output device to initiate a user alert, contemporaneously with the occurrence of the event, indicating to the user that the event has occurred.

According to some, but not necessarily all embodiments of the invention there is provided an apparatus, comprising: means for determining that an event has occurred; means for obtaining, from at least one detector, a detection of one or more bio-signals from a user; and means for processing the detection of the one or more bio-signals to decide whether to control at least one user output device to initiate a user alert, contemporaneously with the occurrence of the event, indicating to the user that the event has occurred.

According to some, but not necessarily all embodiments of the invention there is provided a non-transitory computer readable medium comprising computer program instructions that, when executed by at least one processor, cause at least the following to be performed: determining that an event has occurred; obtaining, from at least one detector, a detection of one or more bio-signals from a user; and processing the detection of the one or more bio-signals to decide whether to control at least one user output device to initiate a user alert, contemporaneously with the occurrence of the event, indicating to the user that the event has occurred.

BRIEF DESCRIPTION OF THE DRAWINGS

For a better understanding of various examples of embodiments of the present invention reference will now be made by way of example only to the accompanying drawings in which.

DETAILED DESCRIPTION

Embodiments of the invention relate to using bio-signals to determine when to provide a user alert. In particular, when an event occurs at an apparatus, one or more bio-signals, detected contemporaneously with the occurrence of the event, are processed to determine whether a user is concentrating. If the user is not concentrating, a user alert alerting the user to the event is provided. If the user is concentrating, the user alert may be delayed or cancelled.

The Figures illustrate an apparatus 10/20, comprising: at least one memory 14 storing a computer program 16 comprising computer program instructions 18; and at least one processor 12 configured to execute the computer program instructions 18 to cause the apparatus 10/20 at least to perform: determining that an event has occurred; obtaining, from at least one detector 26, a detection of one or more bio-signals from a user; and processing the detection of the one or more bio-signals to decide whether to control at least one user output device 22 to initiate a user alert, contemporaneously with the occurrence of the event, indicating to the user that the event has occurred.

Figure 1:
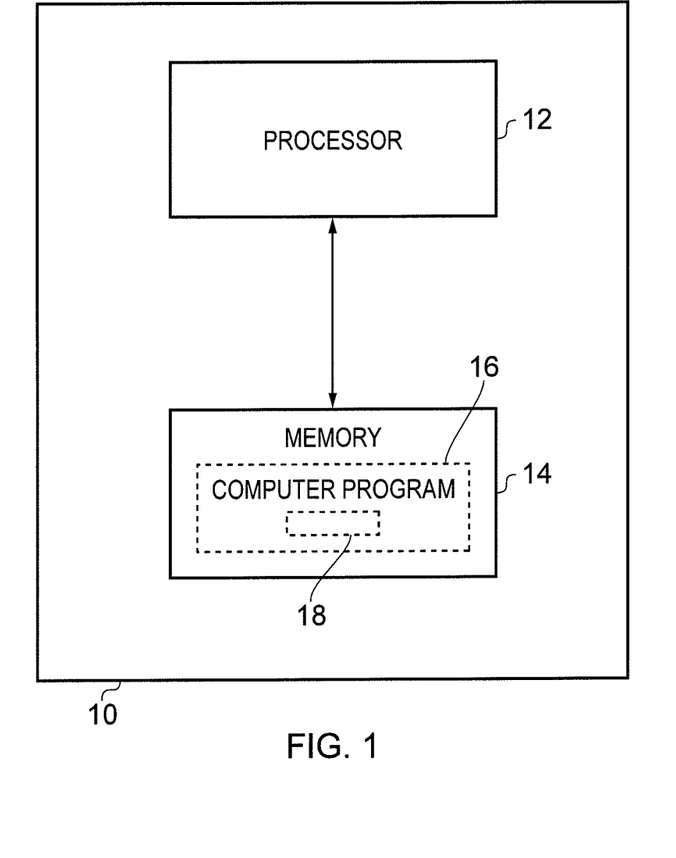
FIG. 1 illustrates an apparatus.

FIG. 1 illustrates an apparatus 10. The apparatus may, for example, be a chip or a chip-set. The apparatus 10 illustrated in FIG. 1 comprises a processor 12 and a memory 14. In alternative embodiments of the invention, the apparatus 10 may comprise multiple different processors and the functions of the processor 12 described below may be performed by the multiple different processors.

The processor 12 is configured to read from and write to the memory 14. The processor 12 may also comprise an output interface via which data and/or commands are output by the processor 12 and an input interface via which data and/or commands are input to the processor 12.

Although the memory 14 is illustrated as a single component, it may be implemented as one or more separate components, some or all of which may be integrated/removable and/or may provide permanent/semi-permanent/dynamic/cached storage.

The memory 14 stores a computer program 16 comprising computer program instructions 18 that control the operation of the apparatus 10/20 when loaded into the processor 12. The computer program instructions 18 provide the logic and routines that enables the apparatus 10/20 to perform the methods illustrated in FIGS. 3, 4 and 5. The processor 12, by reading the memory 14, is able to load and execute the computer program instructions 18.

The computer program 16 may arrive at the apparatus 10/20 via any suitable delivery mechanism 40. The delivery mechanism 40 may be, for example, a tangible, non-transitory computer-readable storage medium, a computer program product, a memory device, a record medium such as a Compact Disc, a Digital Versatile Disc or Blu-Ray disc, or any article of manufacture that tangibly embodies the computer program 16. The delivery mechanism 40 may be a signal configured to reliably transfer the computer program 16.

Figure 2:
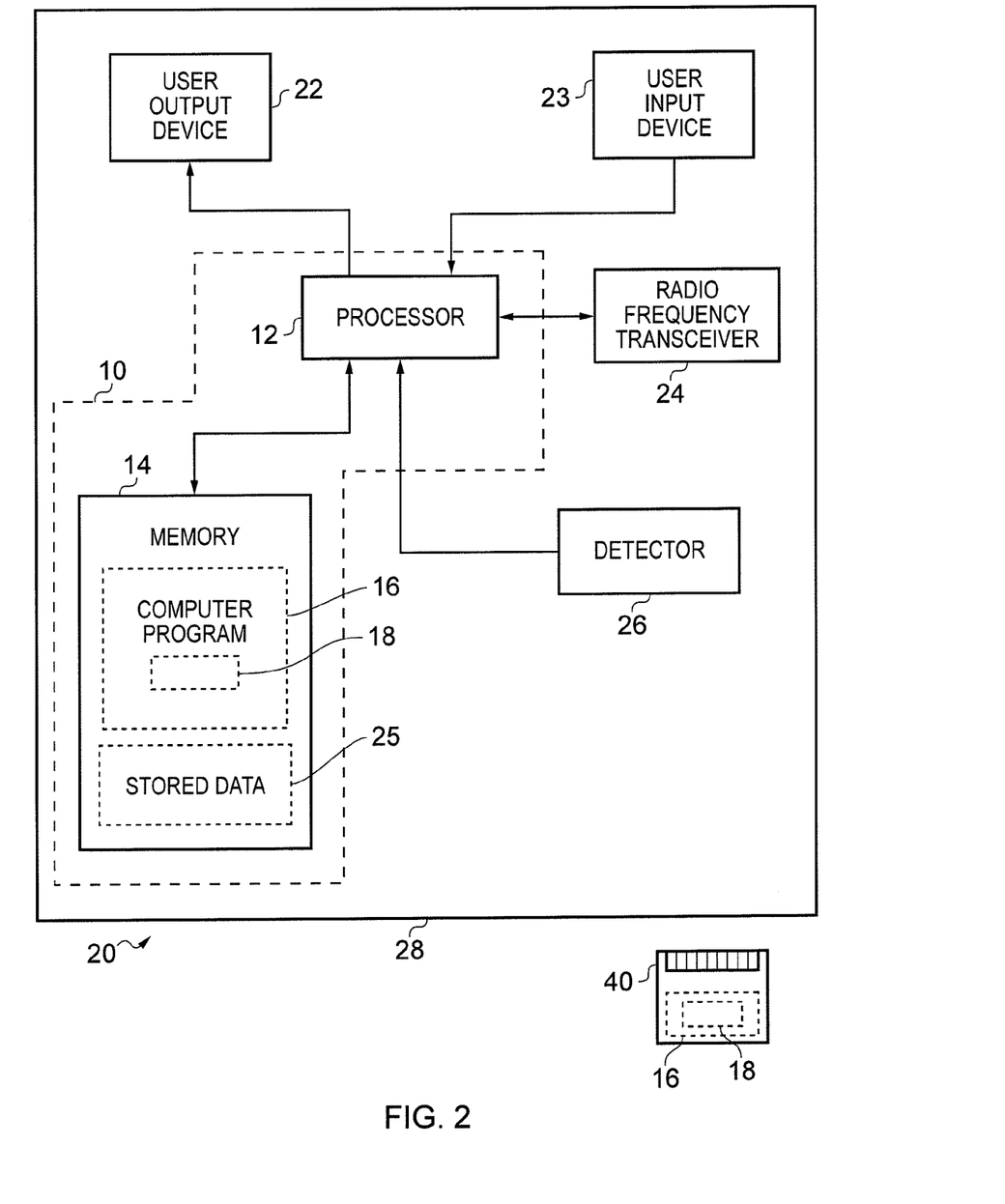
FIG. 2 illustrates a further apparatus.

FIG. 2 illustrates a further apparatus 20. The apparatus 20 illustrated in FIG. 2 may, for example, be a hand portable electronic device such as a mobile telephone, a personal music player, a personal digital assistant, a tablet computer, or a games console. The apparatus (hand portable electronic device) 20 may, for example, be wearable by a user. For example, the apparatus 20 may be wearable on a user's wrist or on a user's head. In other examples, the apparatus 20 may not be hand portable.

The apparatus 20 illustrated in FIG. 2 comprises the apparatus 10 illustrated in FIG. 1. In this particular example, the apparatus 20 further comprises a housing 28, a user output device 22, a user input device 23, a detector 26 and a radio frequency transceiver 24. For clarity reasons, only a single user output device 22, a single user input device 23, a single detector 26 and a single radio frequency transceiver 24 are illustrated in FIG. 2. However, in practice, the apparatus 10 may comprise multiple (different) user output devices, multiple (different) user input devices, multiple (different) detectors and/or multiple (different) radio frequency transceivers.

In this example, the housing 28 houses: the processor 12, the memory 14, the user output device 22, the user input device 23, the detector 26 and the radio frequency transceiver 24. The elements 12, 14, 22, 23, 24 and 26 are co-located within the housing 28. The elements 12, 14, 22, 23, 24 and 26 are operationally coupled and any number or combination of intervening elements can exist (including no intervening elements).

The processor 12 is configured to receive an input from the detector 26. While the detector 26 is housed within the housing 28 of the apparatus 20 in the FIG. 2 example, in other examples the detector 26 might not be housed within the housing 28 and might not be part of the apparatus 20. For example, the apparatus 20 may be a portable electronic device and the detector 26 may be in a counterpart device that is in communication with the portable electronic device (for example, via radio frequency signals). The counterpart device may, for instance, be wearable by a user (such as on a user's wrist, on a user's head or underneath a user's skin).

The detector 26 is configured to detect bio-signals. The detector 26 may be any type of detector that is suitable for detecting a bio-signal. A bio-signal is considered to be any type of signal that emanates from a biological being (such as a human being). A bio-signal may, for example, be a bio-electrical signal, a bio-mechanical signal, an aural signal, a chemical signal or an optical signal.

Bio-electrical signals may be electrical currents produced by one or more electrical potential differences across a tissue, organ or cell system such as the nervous system. Bio-electrical signals include signals that are detectable, for example, using electroencephalography, magnetoencephalography, galvanic skin response techniques, electrocardiography and electromyography.

Bio-mechanical signals may, for example, include signals that are detectable using one or more accelerometers or mechanomyography. Aural signals may, for example, include signals that are detectable using a microphone. Chemical signals may, for instance, include signals that are detectable using an oxygenation detector or a pH detector. Optical signals may, for example, include signals detectable using a camera.

The processor 12 is also configured to provide an output to the user output device 22 and to receive an input from the user input device 23. The user input device 23 may, for example, be a keypad or a microphone (in which case it may be the same device as the detector 26). The user output device 22 may, for example, be a display, a loudspeaker or a vibration alert device.

In some embodiments of the invention, the user input device 23 may be integrated with the user output device 22. For example, the user input device 23 and the user output device 22 may be provided by a touch sensitive display.

The processor 12 is configured to receive inputs from and provide outputs to the radio frequency transceiver 24. The radio frequency transceiver 24 is configured to transmit and receive radio frequency signals. The radio frequency transceiver 24 may, for example, be a cellular transceiver that is compatible with one or more cellular protocols such as GSM (Global System for Mobile Communications), IS-95 (Interim Standard 95) or UMTS (Universal Mobile Telecommunications System). Alternatively, the radio frequency transceiver 24 may be a short range transceiver that is compatible with one or more short range protocols, such as Bluetooth protocols or IEEE (Institute of Electrical and Electronic Engineers) protocols. In some embodiments of the invention, the apparatus 20 comprises one or more cellular transceivers and one or more short range transceivers.

A first method according to embodiments of the invention will now be described in relation to FIG. 3. In the first method, an event occurs at the apparatus 20. The event is associated with a user alert and may, for example, be an incoming communication from a third party, such as an incoming telephone call or message. Alternatively, the event may be a clock reaching a preset time. For example, a user may have programmed the apparatus 20 to provide a user alert at the preset time (for example, by setting an alarm clock or a reminder system). The user alert associated with the event may, for example, comprise one or more of the following: a visual alert, an aural alert and a vibratory alert.

Figure 3:
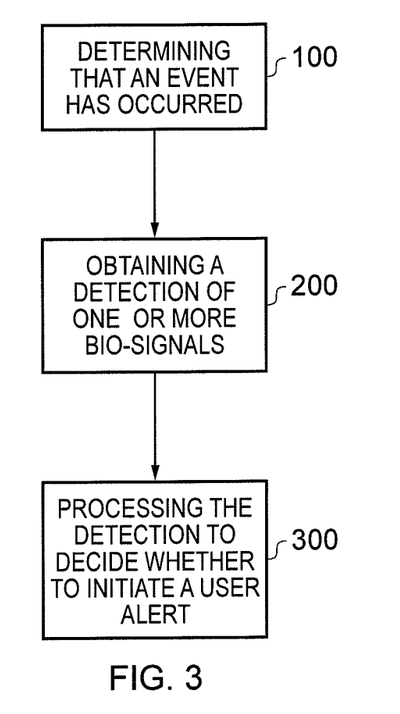
FIG. 3 illustrates a first method.

At block 100 of FIG. 3, the processor 12 determines that the event has occurred. At block 200 of FIG. 3, the processor 12 obtains a detection of one or more bio-signals from at least one detector 26. In this particular example, the detection is obtained subsequent to the occurrence of the event in block 100 of FIG. 3. However, it should be borne in mind that the detection may, for example, be obtained before, during or after the event occurs at block 100.

The detection may be performed at an instance in time, or over a period of time (for example, depending upon on the type(s) of bio-signal(s) being detected). The processor 12 may control the detector(s) 26 to obtain the detection (for example, by activating the detector(s) 26). Alternatively, the processor 12 may obtain the detection by merely reading the detector(s) 26 at an instance in time, or over an appropriate period of time. In some embodiments of the invention, the detection may be obtained at several different instances in time or over several periods of time. These instances or periods of time may or may not span a larger time period that encompasses the occurrence of the event.

Performing the detection may comprise detecting one or more of any of the types of bio-signal described above. For example, one or more bio-electrical signals, one or more bio-mechanical signals, one or more aural signal signals, one or more chemical signals and/or one or more optical signals may be detected.

At block 300 in FIG. 3, the processor 12 processes the detection obtained at block 200 to determine whether to control at least one user output device 22 to initiate a user alert, contemporaneously with the occurrence of the event. The purpose of the processing may be to try to determine, from the detection of the bio-signal(s), whether the user is concentrating. If the detection of the bio-signals(s) indicates that the user is concentrating, the processor 12 will delay or cancel the user alert relating to the event.

The processor 12 may, for example, process the detection of the bio-signal(s) to determine whether it has a form that indicates that the user is concentrating. In order to determine this, the processor 12 may or may not compare the detection of the bio-signal(s) with reference data 25 stored in the memory 14.

In some embodiments of the invention, if the detection of the bio-signal(s) has a first form (for instance, indicating that the user is not concentrating), the processor 12 controls at least one the user output device 22 to initiate a user alert contemporaneously with the occurrence of the event. For example, the user alert may comprise one or more of the following: a visual alert, an aural alert and a vibratory alert. The purpose of the user alert is to get the user's attention. That is, to provide the user with information indicating that the event has occurred.

Bio-signals may indicate that a user is concentrating if they are in a steady state. For example, if a user is concentrating, he is likely to be relaxed (and perhaps stationary) with a steady breathing pattern and a steady, coherent heart rate.

If the detection of the bio-signal(s) has a second form (for instance, indicating that the user is concentrating), the processor 12 does not control that/those user output device(s) 22 to initiate the user alert contemporaneously with the detection of the bio-signals(s).

If the detection of the bio-signal(s) has the second form, the processor 12 may delay controlling the user output device(s) 22 to initiate the user alert. In some implementations, the processor 12 may merely delay controlling the user output device(s) 22 to initiate the user alert for a preset time. In other implementations, the processor 12 may obtain a further detection of the bio-signals after deciding to delay the initiation of the user alert.

The processor 12 may, for example, process the further detection of the bio-signal(s) to decide whether to control the user output device(s) 22 to initiate the user alert, contemporaneously with the further detection of the bio-signal(s), indicating to the user that the event has occurred.

In some implementations of the invention, the processor 12 may be configured to learn what forms of bio-signal indicate that a user is concentrating. For example, initially, when an event occurs (for instance, an incoming telephone call), the processor 12 may obtain a detection of one or more bio-signals prior to controlling one or more user output devices 22 to initiate a user alert. After the user alert has been initiated, the processor 12 may provide a user-selectable option (for example, selectable via the user input device 23) which enables a user to indicate to the processor 12 that he was concentrating when the user alert was initiated and did not wish to be disturbed. If the user selects this option, an indication of the form of the detected the bio-signal(s) is stored as reference data 25. The reference data 25 can then be used by the processor 12 to determine whether or not to initiate a user alert when another event occurs (for example, when there is another incoming telephone call).

The processor 12 may, for example, use a classifier such as a Gaussian mixture model or an artificial neural network when comparing subsequent bio-signal detections with the reference data 25, in order to decide whether to classify the subsequent bio-signal detections as being indicative of user concentration.

Figure 4:
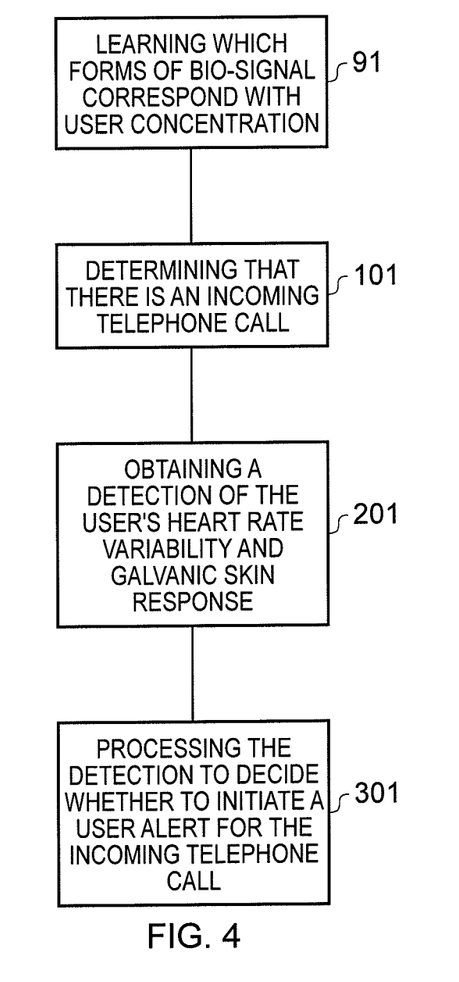
FIG. 4 illustrates a second method.

FIG. 4 illustrates a second method according to embodiments of the invention. In the second method, the apparatus 20 is a mobile telephone that is in radio communication with one or more counterpart devices comprising a heart rate monitor and a galvanic skin response detector.

Initially, at block 91 of FIG. 4, the processor 12 learns which forms of bio-signal correspond with user concentration. In this example, the processor 12 obtains one or more detections from the heart rate monitor and the galvanic skin response detector and provides one or more prompts via the user output device 22 (which may, for example, be a display) asking the user to indicate, via the user input device 23, whether he was concentrating when the detection(s) was/were obtained. This could be done, for example, by asking the user whether he was in a high, medium or low state of concentration.

In response to user input from the user, the processor 12 stores the results as reference data 25 in the memory 14. This process enables the processor 12 to learn, for any user, which form(s) of a particular bio-signal correspond with user concentration.

At a later time, at block 101 of FIG. 4, the processor 12 determines that there is an incoming telephone call at the mobile telephone 20. In this particular example, the processor 12 responds to the occurrence of this event at block 201 by subsequently obtaining a detection of the user's heart rate variability from the heart rate monitor and the user's galvanic skin response from the galvanic skin response detector. In other examples, the processor 12 may instead obtain a detection of the user's heart rate variability and the user's galvanic skin response periodically, rather than responding to the event.

At block 301 of FIG. 4, the processor 12 processes the detection of the user's heart rate variability and the user's galvanic skin response obtained at block 201 in the manner described above in relation to block 300 of FIG. 3, to decide whether to control one or more user output devices 22 to initiate a user alert for the incoming telephone call. For example, the processor 12 may compare the user's heart rate variability and the user's galvanic skin response with the reference data 25 in the memory 14.

In some embodiments of the invention, if either the detected heart rate variability or the detected galvanic skin response is indicative of user concentration, the processor 12 may, for example, refrain from controlling any of the user output devices 22 to initiate a user alert for the incoming telephone call. If neither the detected heart rate variability nor the detected galvanic skin response is indicative of user concentration, the processor 12 controls one or more user output devices 22 to initiate a user alert for the incoming telephone call. The user alert may, for example, comprise a visual alert, an aural alert and a vibratory alert.

In alternative embodiments of the invention, if both the detected heart rate variability and the detected galvanic skin response are indicative of user concentration, the processor 12 may, for example, refrain from controlling any of the user output devices 22 to initiate a user alert for the incoming telephone call. In these alternative embodiments, if either the detected heart rate variability or the detected galvanic skin response is not indicative of user concentration, the processor 12 controls one or more of the user output devices 22 to initiate a user alert for the incoming telephone call.

Figure 5:
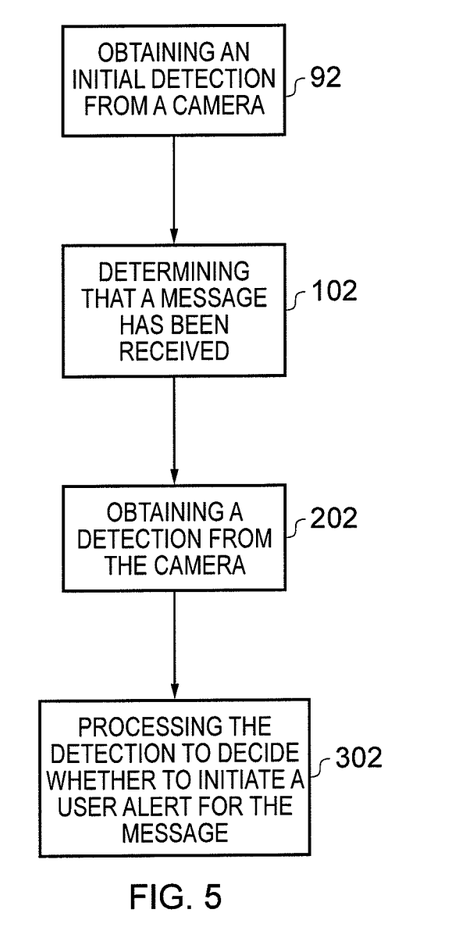
FIG. 5 illustrates a third method.

FIG. 5 illustrates a third method according to embodiments of the invention. In the third method, the apparatus 20 is a personal computer comprising a display and a camera. The camera may, for example, be directed at a user. In this particular example, the processor 12 is configured to obtain a bio-signal from the camera, periodically, in the form of still image or a video of the user.

At block 92 of FIG. 5, the processor 12 obtains a detection of a bio-signal from the camera. The detection may, for example, be one or more still images or videos of the user. The detection may be stored by the processor 12 as reference data 25 in the memory 14.

At block 102 of FIG. 5, the processor 12 determines that a message has been received by the personal computer. The message could, for example, be an instant message.

At block 202 of FIG. 5, the processor 12 obtains another detection from the camera. The detection may, for example, be one or more still images or videos of the user.

At block 302 of FIG. 5, the processor 12 processes the detection obtained at block 202 of FIG. 5, in the manner described above in relation to block 300 of FIG. 3, to decide whether to control the display to display a visual user alert indicating that the message has been received.

For example, the processor 12 may compare the detection obtained in block 202 with the detection obtained in block 92 (the reference data 25). If, from the comparison, the processor 12 determines that the user is moving, the processor 12 may control the display to display a visual user alert indicating that a message has been received. If the processor 12 determines that the user is not moving, the processor 12 may refrain from initiating a visual user alert for the message or delay initiating a visual user alert. This is because, if the detection has this steady state, it may indicate that the user is concentrating.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry); and
(b) to combinations of circuits and software (and/or firmware), such as (as applicable): (i) to a combination of processor(s) or (ii) to portions of processor(s)/software (including digital signal processor(s)), software; and memory(ies) that work together to cause an apparatus, such as a mobile telephone or server, to perform various functions); and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile telephone or a similar integrated circuit in a server, a cellular network device, or other network device.

The blocks illustrated in the FIGS. 3, 4 and 5 may represent operations in a method and/or sections of code in the computer program 22. The illustration of a particular order to the blocks does not necessarily imply that there is a required or preferred order for the blocks and the order and arrangement of the blocks may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed. For example, some examples of embodiments of the invention are described in relation to FIGS. 4 and 5. In these examples, the detector(s) 26 detecting the bio-signals are described as being a heart rate monitor, a galvanic skin response detector and a camera. However, it will be appreciated that by those skilled in the art that, in other embodiments of the invention, other types of detector may be used for detecting other types of bio-signal.

It should also be appreciated that the processor 12 may obtain and process a detection of any number of bio-signals, to determine whether to control one or more user output devices to initiate a user alert contemporaneously with the occurrence of the event. For example, in the context of the FIG. 4 example, the processor 12 may obtain and process a detection from a breathing monitor in addition to a heart rate monitor and a galvanic skin response detector. As mentioned above, a steady breathing rhythm may indicate that a user is concentrating. In the context of the FIG. 5 example, the processor 12 may obtain and process a detection from an accelerometer in addition to the camera. If the characteristics of this detection indicate that a user has not been moving (significantly) for a period of time, it may be considered to indicate that the user is concentrating.

In some embodiments of the invention, it may be necessary for a plurality of detected bio-signals to have characteristics that are indicative of user concentration before a user alert is cancelled or delayed by the processor 12. In other embodiments, the processor 12 may cancel or delay the user alert if a single detected bio-signal has one or more characteristics that are indicative of user concentration.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method, comprising:
   determining that an event has occurred;
   obtaining, from at least one detector, a detection of one or more bio-signals from a user;
   processing the detection of the one or more bio-signals to decide whether to control at least one user output device to initiate a user alert, contemporaneously with the occurrence of the event, indicating to the user that the event has occurred; and
   if the detection of the one or more bio-signals has a first form, controlling the at least one user output device to initiate the user alert contemporaneously with the occurrence of the event, and if the detection of the one or more bio-signals has a second form, not controlling the at least one user output device to initiate the user alert contemporaneously with the occurrence of the event, and wherein the second form indicates that the user is concentrating.

2. A method as claimed in claim 1, further comprising: storing reference data indicative of the one or more bio-signals having the second form, and wherein processing the detection of the one or more bio-signals comprises comparing the detection of the one or more bio-signals with the reference data.

3. A method as claimed in claim 1, further comprising: if the detection of the one or more bio-signals has the second form, delaying controlling the at least one user output device to initiate the user alert.

4. A method as claimed in claim 1, further comprising: if the detection of the one or more bio-signals has the second form, obtaining a further detection from the at least one detector of the one or more bio-signals; and processing the further detection of the one or more bio-signals to decide whether to control the at least one user output device to initiate a user alert, contemporaneously with the further detection, indicating to the user that the event has occurred.

5. A method as claimed in claim 1, wherein the user alert comprises a visual, aural or vibratory alert for getting the user's attention.

6. A method as claimed in claim 1, wherein the event occurs at a hand portable electronic device.

7. A method as claimed in claim 1, wherein the event is an incoming communication from a remote party, or reaching a preset time.

8. An apparatus, comprising:
at least one memory storing a computer program comprising computer program instructions; and
at least one processor configured to execute the computer program instructions to cause the apparatus at least to perform:
determining that an event has occurred;
obtaining, from at least one detector, a detection of one or more bio-signals from a user;
processing the detection of the one or more bio-signals to decide whether to control at least one user output device to initiate a user alert, contemporaneously with the occurrence of the event, indicating to the user that the event has occurred; and
if the detection of the one or more bio-signals has a first form, controlling the at least one user output device to initiate the user alert contemporaneously with the occurrence of the event and if the detection of the one or more bio-signals has a second form, not controlling the at least one user output device to initiate the user alert contemporaneously with the occurrence of the event, wherein the second form indicates that the user is concentrating.

9. An apparatus as claimed in claim 8, wherein the at least one processor is configured to execute the computer program instructions to cause the apparatus to perform: storing reference data indicative of the one or more bio-signals having the second form, and wherein processing the detection of the one or more bio-signals comprises comparing the detection of the one or more bio-signals with the reference data.

10. An apparatus as claimed in claim 8, wherein the at least one processor is configured to execute the computer program instructions to cause the apparatus to perform: if the detection of the one or more bio-signals has the second form, delaying controlling the at least one user output device to initiate the user alert.

11. An apparatus as claimed in claim 8, wherein the at least one processor is configured to execute the computer program instructions to cause the apparatus to perform: if the detection of the one or more bio-signals has the second form, obtaining a further detection from the at least one detector of the one or more bio-signals; and processing the further detection of the one or more bio-signals to decide whether to control the at least one user output device to initiate a user alert, contemporaneously with the further detection, indicating to the user that the event has occurred.

12. An apparatus as claimed in claim 8, wherein the user alert comprises a visual, aural or vibratory alert for getting the user's attention.

13. An apparatus as claimed in claim 8, wherein the event occurs at a hand portable electronic device.

14. A non-transitory computer readable medium comprising computer program instructions that, when executed by at least one processor, cause at least the following to be performed:
determining that an event has occurred;
obtaining, from at least one detector, a detection of one or more bio-signals from a user;
processing the detection of the one or more bio-signals to decide whether to control at least one user output device to initiate a user alert, contemporaneously with the occurrence of the event, indicating to the user that the event has occurred; and
if the detection of the one or more bio-signals has a first form, controlling the at least one user output device to initiate the user alert contemporaneously with the occurrence of the event and if the detection of the one or more bio-signals has a second form, not controlling the at least one user output device to initiate the user alert contemporaneously with the occurrence of the event, wherein the second form indicates that the user is concentrating.

* * * * *